May 29, 1951 W. A. WILLIAMS 2,554,969
OVERLOAD RELEASE MECHANISM
Filed March 26, 1948 2 Sheets-Sheet 1

WITNESSES
Hubert Fuchs
George L. Comly

INVENTOR:
William A. Williams,
BY Paul & Paul
ATTORNEYS.

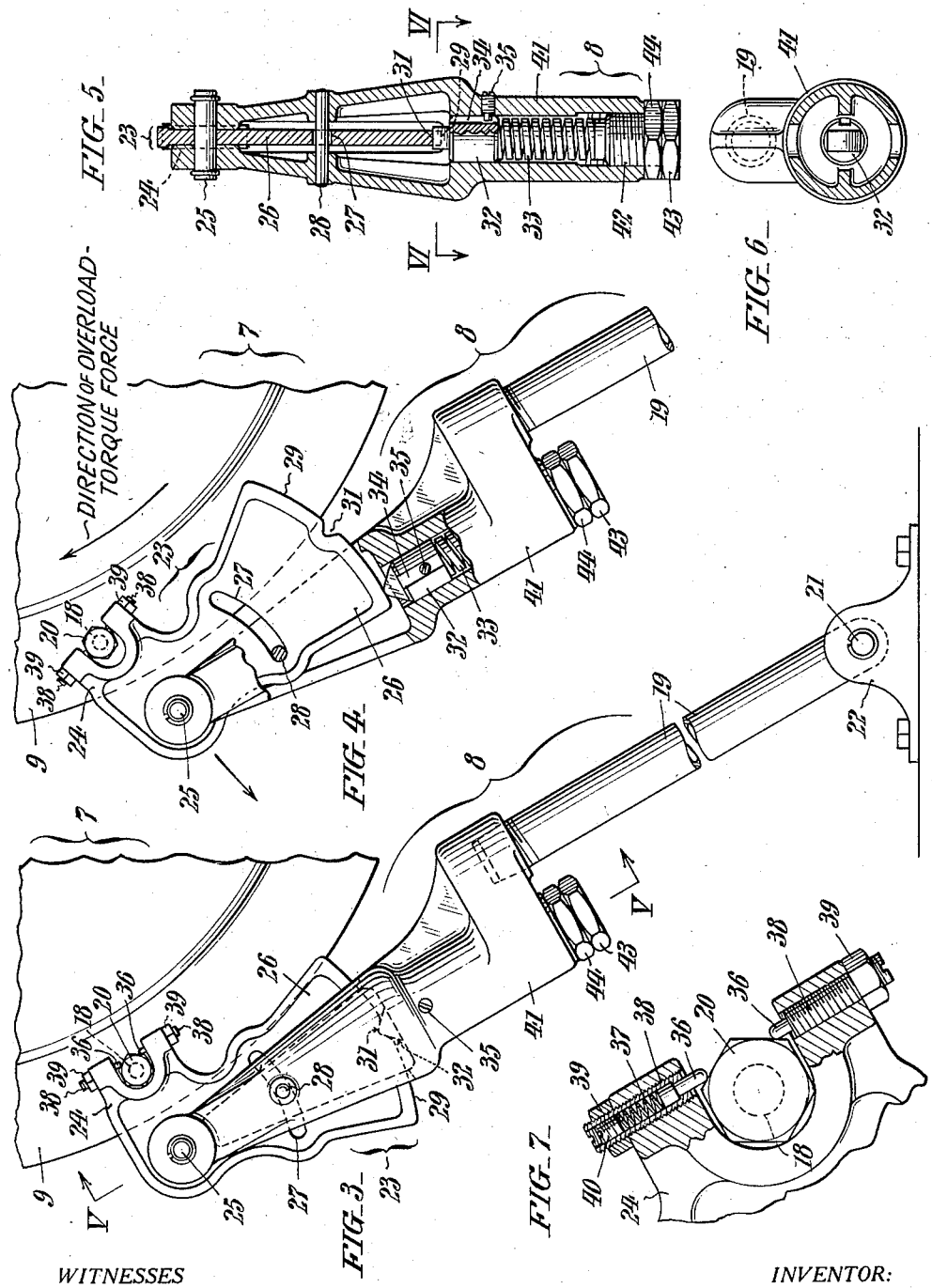

Patented May 29, 1951

2,554,969

UNITED STATES PATENT OFFICE 2,554,969

OVERLOAD RELEASE MECHANISM

William A. Williams, Philadelphia, Pa., assignor to The American Pulley Company, Philadelphia, Pa., a corporation of Pennsylvania Application March 26, 1948, Serial No. 17,273

5 Claims. (Cl. 192—150)

This invention relates to an overload release mechanism which, although capable of a variety of applications, is particularly suited for use in combination with a speed change drive unit.

It is well known in the art to employ a speed reduction unit in which the low speed element is mounted directly on the shaft of a driven machine and the high speed element is adapted to be coupled or otherwise connected with a motor or other prime mover. An example of such a reduction unit is shown in United States Letters Patent No. 2,116,166, issued May 3, 1938, to Joseph D. Christian. As such units are mounted upon a shaft, without a base for the casing in which the gears house, it is customary to provide a torque arm for restraining the casing against rotation under the reactive torque of the power transmission.

The principal object of this invention is to provide a torque arm of this character which in addition to its usual function is releasably connected to the casing of the speed change unit and so designed that it will automatically disengage said casing when a predetermined load is encountered at the driven machine. Embodied within the torque arm are all of the elements which enable it to serve as an effective safeguard against overload, causing a release of the casing when the reactive torque reaches a certain value, and thus preventing any type of failure or injury to any part of the driven machine or of the speed change unit. Moreover, such release is instantaneous so that in the event of an overload with sudden stoppage no damage occurs from the fly wheel effect of the motor or of the sheaves or other parts driven thereby; and in this respect the mechanism is greatly superior to an overload release which operates to shut off the motor rather than to release the casing.

A more specific object of the preferred form of the invention is to provide a torque arm of this character which is pivotally connected at one end to a fixed object and which has a jaw at the other end engaging a part of the casing of the speed change unit, the elements of the torque arm being so designed that they serve to restrain rotation of the casing until a predetermined load is reached at which time the reactive torque of the casing causes the torque arm to fall by gravity, and thus release the casing whereby it may rotate freely.

Other objects and advantages of the invention, including those derived from simplicity and economy of manufacture, ease of assembly and reliability, will become more apparent from the description of one embodiment of the invention as set forth hereinafter having reference to the accompanying drawings, whereof:

Fig. 3 represents an enlarged elevation of the overload release mechanism, showing the manner in which it is applied to the speed change unit;

Fig. 4 represents a view similar to Fig. 3, but showing only a portion of the overload release mechanism with parts thereof broken away, and illustrating the mechanism in the position which it occupies when it is about to disengage the speed change unit;

Fig. 5 represents a longitudinal cross section of the overload release mechanism, taken as indicated by the arrows V—V of Fig. 3;

Fig. 6 represents a transverse section of the same, taken as indicated by the arrows VI—VI of Fig. 5; and Fig. 7 represents an enlarged fragmentary view of the jaw of the overload release mechanism with portions broken away to reveal the spring-urged fingers disposed within said jaw.

Figure 1:
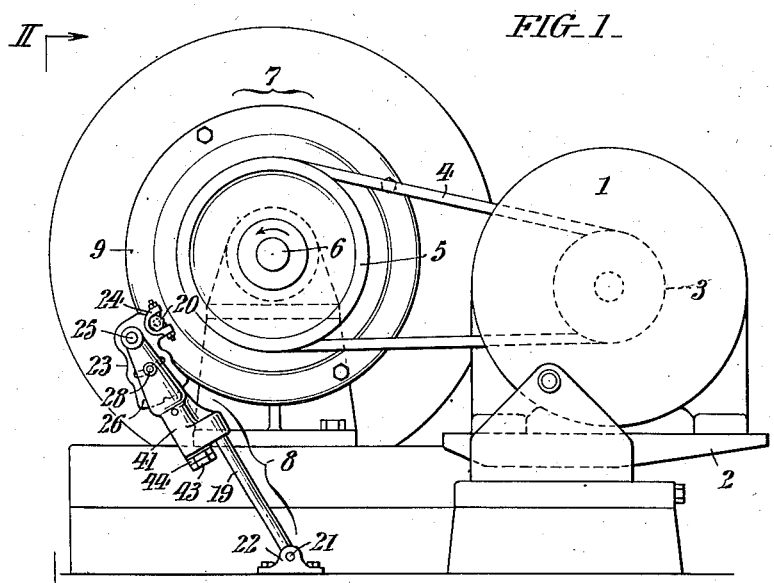
Fig. 1 represents in side elevation a motor and reduction drive embodying an overload release mechanism of my invention.

In the particular example of the invention selected for illustration (see Figure 1) a reduction drive is shown which consists of a motor 1 mounted on a base 2 and having a drive pulley 3 connected by a belt 4 with a driven pulley 5 on the input shaft 6 of a speed change unit 7. Applied to the casing 9 of the speed change unit 7 is a torque arm 8 which constitutes an overload release mechanism involving the novel features of my present invention.

Figure 2:
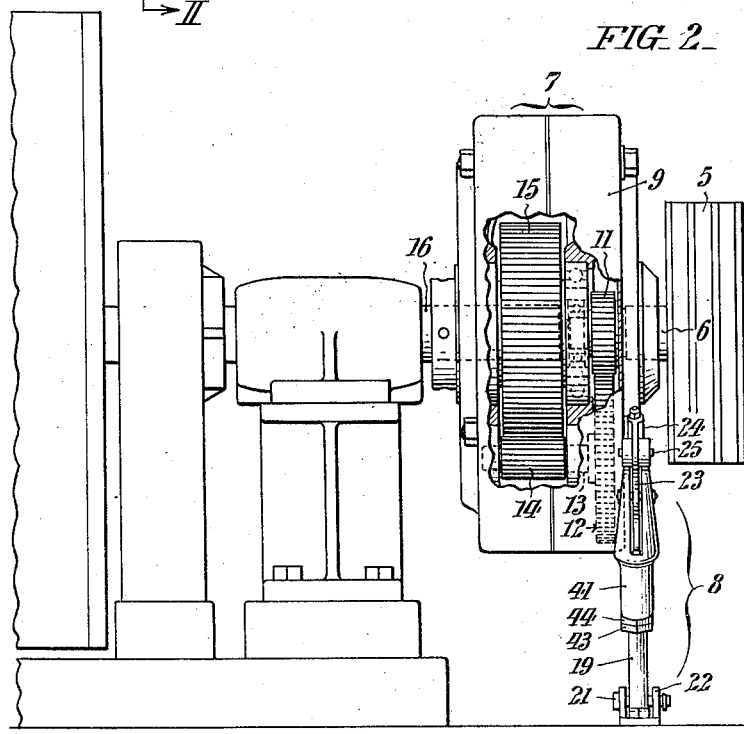
Fig. 2 represents an end elevation of the drive, viewed as indicated by the arrows II—II in Fig. 1, portions of the speed change unit being broken away to reveal the interior construction.

In Figure 2 the interior construction of the speed change unit 7 is illustrated, showing the various gears housed and journalled within the casing 9. The unit 7 has a pinion gear 11 on its input shaft 6 which drives a second gear 12 on a shaft 13 mounted within the walls of the unit. A third gear 14, mounted on shaft 13, drives a fourth gear 15 which is affixed to the output shaft 16 of the unit. It may be assumed that the output shaft 16 of the speed change unit 7 constitutes the powered shaft of a machine, press, or other device to be driven. The primary support for the speed change unit 7 is thus provided by the shaft 16 of the driven machine. Reduction units of this character are well known in the art, an example thereof being shown in the aforesaid patent to J. D. Christian; and hence the detailed construction of such a unit need not be described in the present application.

Since the speed change unit 7 is suspended without a base upon the shaft 16 of a driven machine, it will be apparent that reactive torque will tend to rotate the casing 9. Unless means are provided to resist such rotation of the casing 9, when the driven machine is under load the motor 1, acting through the drive belt 4 and the gears of the speed change unit, will merely drive the casing 9, while the shaft 16 of the machine remains idle. It has, therefore, been customary in a drive of this character to provide a torque arm for restraining rotation of the casing of the speed change unit.

The torque arm 8 of the present invention normally serves in the usual manner to restrain rotation of the casing 9 by engagement with a nut 20 at the end of an externally projecting bolt 18 on the casing, such engagement in the illustrated example being near the periphery of the casing; but the torque arm 8, differing from the usual form of torque arm, also serves as an overload release mechanism. Specifically, it is so designed that in response to a predetermined reactive force, as when a predetermined load is encountered at the driven machine, the torque arm 8 will automatically disengage and the torque arm is so mounted and weighted that it is unbalanced and will, when disengaged, fall by gravity, allowing the casing 9 to rotate freely and preventing any failure or injury to the driven machine, or to the speed change unit 7.

As shown in Figures 3 to 7 inclusive, the torque arm 8 comprises a shank 19 having its lower end pivotally connected at 21 to a bracket 22 which is secured to a floor or other fixed object, and having its upper end bifurcated to receive a swinging element 23 with a jaw 24 which partially surrounds and releasably engages the nut 20 on the casing 9. The longitudinal axis of the torque arm 8, including its shank 19, is disposed substantially tangential to the circular path described by the nut 20 on the casing 9 when said casing revolves. Moreover, the torque arm 8 is disposed at such an angle to the casing that it will gravitate away from the casing when released therefrom. The swinging element 23 is in the form of a bell crank lever fulcrumed by means of a pin 25 at the upper end of the torque arm and having one arm which extends towards the casing 9 and forms the jaw 24 and having a second and longer arm 26 which is normally restrained against movement with relation to the shank.

In the illustrated example of the invention the longer arm 26 of swinging element 23 is in the form of a flat plate having an arcuate slot 27 engaged by a pin 28 and thereby limited to a definite angular movement, approximately twenty degrees. At its free end the arm 26 has a curved edge 29 with a central notch 31 adapted to be engaged by a locking device in the form of a detent 32 having a wedge-shaped end, complementary to the notch 31. The detent 32 is urged into engagement with the notch 31 by a spring 33 and has a longitudinal groove 34 engaged by a key 35 which prevents rotation about its axis, while permitting the detent to move bodily towards and away from the notch 31.

The jaw 24 has a mouth which opens substantially at a right angle to the axis of the shank 19. To restrict the opening at the mouth of jaw 24 each side thereof is provided, as clearly shown in Figure 7, with fingers 36 which are urged towards each other, across the mouth of the jaw, by springs 37. The fingers 36 and springs 37 are accommodated within threaded sleeves 38 the positions of which may be adjusted and secured by nuts 39. Screw bolts 40 at the outer ends of the sleeves 37 are employed to regulate the pressure of springs 37 upon the fingers 36.

As shown in Figures 3 and 4 the shank 19 has an offset portion 41 which furnishes a housing for the spring 33 which urges the detent 32 towards the swinging element 23. At its base, the offset spring housing 41 has a threaded plug 42 which is in contact with the lower end of spring 33 and is provided with a nut-shaped head 43 disposed exteriorly of the housing. An adjusting nut 44 fixes the position of the plug 42 relative to the spring housing 41 and hence regulates the degree of compression of the spring 33. In this manner the force with which spring 33 acts upon the detent 32 can be regulated at will. Desirably the spring housing 41 may be filled with grease, whereby all moving parts therein are lubricated and the action of the spring 33 is rendered positive and uniform.

By means of the plug 42 and adjusting nut 44 the compression spring 33 may be regulated to release the swinging arm 23, by disengagement of detent 32 with notch 31, whenever a predetermined force is reached or exceeded tending to rotate the jaw 24 about its pivot pin 25. The reactive torque tends to rotate the casing 9 in a clockwise direction as viewed in Figure 4. When the driven machine operates under normal load, the torque arm is under tension but this force is insufficient to dislodge the swinging arm 23, which assumes the position represented in Fig. 3. Furthermore, the fingers 35 of jaw 24 prevent the torque arm from falling away from the nut 20 of the casing 9. If an abnormal condition occurs, caused by overloading of the driven machine, the reactive torque exceeding a predetermined value, the swinging arm 23 will disengage detent 32 and swing in a counter-clockwise direction to the position represented in Figure 4. At this point the torque arm 8 is held in engagement with nut 20 only by means of the spring-pressed fingers 35. As the casing 9 continues its movement the fingers 35 retract, opening the mouth of the jaw 24 and causing the torque arm to be released from connection with the casing, whereupon the torque arm falls by gravity. The machine will come to a full stop and as long as the motor 1 continues to operate it will then merely drive the casing 9, instead of the machine upon which the speed change unit is mounted. After the motor has been shut off and the condition causing the overload has been corrected, the torque arm may be readily reapplied to the casing 9, and the motor again started.

It will be observed that the jaw 24 is so designed and related to the nut 20 of casing 9, and extends at such an angle in relation to the shank 19 and the direction of movement of pin 18 that a spring 33 of relatively small capacity can effectively control overload release of the torque arm, while limiting such release to circumstances where a very substantial load is encountered at the driven machine. Moreover, the various adjustments which are provided make it possible to adapt the torque arm to a relatively wide range of operations. Furthermore, the torque arm is instantaneously responsive to a condition of overload so that the fly wheel effect of the motor and driven parts cannot cause injury before release of the torque arm takes place.

Although I have described one embodiment of the invention applied to a specific form of reduction gear, it will be apparent that the invention may be applied to a variety of uses, and that various changes, including reversals of parts, and substitution of equivalents, may be made in the apparatus herein described and illustrated, without departing from the spirit of the invention as defined in the annexed claims.

Having thus described my invention, I claim:

1. In combination with a speed change unit comprising a rotatable casing having gears housed therein for transmitting power to a driven machine and having an externally projecting member, the reactive force of said transmission tending to rotate the casing, a torque arm pivoted to a fixed object and normally disposed with its longitudinal axis substantially tangential to the circular path described by said projecting member, said torque arm having thereon a movable jaw partially surrounding and frictionally engaging said projecting member, the central axis of said jaw being normally at a right angle to the longitudinal axis of the torque arm, and said jaw normally restraining the casing against rotation, and mechanism embodied within the torque arm and responsive to said reactive force for causing said jaw to swing relatively to said torque arm to disengage said externally projecting member automatically when a predetermined load is encountered at said driven member, said torque arm being so disposed relatively to the casing that it will gravitate freely away from said casing incident to such disengagement.

2. A self-contained torque arm for the purpose described comprising a shank, and an element pivoted thereon in form of a bell crank lever whereof one arm has a jaw adapted to engage releasably a part of a rotatable object, and the second arm is normally restrained against movement with relation to the shank, and mechanism for releasing said second arm to permit said pivoted element to swing when a predetermined force is applied to said first arm by said rotatable object, said releasing mechanism comprising a locking device embodied within said shank and spring means, also embodied within said shank, for urging said locking device into engagement with said second arm, said jaw having spring-urged means tending to restrict the opening at the mouth thereof.

3. A self contained torque arm for the purpose described comprising a shank, and an element pivoted thereon in form of a bell crank lever whereof one arm has a jaw adapted to engage releasably a part of a rotatable object, and the second arm is normally restrained against movement with relation to the shank, and mechanism for releasing said second arm to permit said pivoted element to swing when a predetermined force is applied to said first arm by said rotatable object, said releasing mechanism comprising a locking device embodied within said shank and spring means, also embodied within said shank, for urging said locking device into engagement with said second arm, said jaw having a mouth which opens substantially at a right angle to the axis of the shank, and spring-urged means in said jaw tending to restrict the opening at said mouth.

4. A self contained torque arm for the purpose described comprising a shank, and an element pivoted thereon in form of a bell crank lever whereof one arm has a jaw adapted to engage releasably a part of a rotatable object, and the second arm is normally restrained against movement with relation to the shank, and mechanism for releasing said second arm to permit said pivoted element to swing when a predetermined force is applied to said first arm by said rotatable object, said releasing mechanism comprising a locking device embodied within said shank and spring means, also embodied within said shank, for urging said locking device into engagement with said second arm, said jaw having a mouth opening substantially at a right angle to the axis of the shank and spring-urged fingers disposed at opposed sides of said jaw to restrict the opening at said mouth.

5. A self contained torque arm for the purpose described comprising a shank, and an element pivoted thereon in form of a bell crank lever whereof one arm has a jaw adapted to engage releasably a part of a rotatable object, and the second arm is normally restrained against movement with relation to the shank, and mechanism for releasing said second arm to permit said pivoted element to swing when a predetermined force is applied to said first arm by said rotatable object, said releasing mechanism comprising a locking device embodied within said shank and spring means, also embodied within said shank, for urging said locking device into engagement with said second arm, one arm of said pivoted element having an arcuate slot, and a pin on said shank engaging within said slot and serving to limit the angular movement of said pivoted element.

WILLIAM A. WILLIAMS.

REFERENCES CITED

The following references are of record in the file of this patent:

UNITED STATES PATENTS

| Number | Name | Date |
|---|---|---|
| 772,568 | Hickley | Oct. 18, 1904 |
| 1,815,345 | Colman | July 21, 1931 |
| 2,046,283 | Berlyn | June 30, 1936 |
| 2,116,166 | Christian | May 3, 1938 |
| 2,132,951 | Hall | Oct. 11, 1938 |
| 2,152,517 | Whitney et al. | Mar. 28, 1939 |